United States Patent
Gilligan et al.

[11] 3,714,261
[45] Jan. 30, 1973

[54] DIFLUOROAMINO COMPOUNDS

[75] Inventors: William H. Gilligan; William E. McQuistion, both of Washington, D.C.

[73] Assignee: The United States of America as represented by the Secretary of the Navy

[22] Filed: Oct. 26, 1967

[21] Appl. No.: 679,290

[52] U.S. Cl. ............................260/583 NH, 149/109
[51] Int. Cl. ..............................................C07c 87/22
[58] Field of Search ........................260/583, 583 NH

[56] References Cited

UNITED STATES PATENTS 3,346,589   10/1967   Gianni et al. ...................260/326.85
3,387,033   6/1968    Talbott et al. .........................260/583

*Primary Examiner*—Leland A. Sebastian
*Attorney*—J. P. Dunlavey and J. O. Tresansky

[57] ABSTRACT

A high energy polyfluoroamino compound useful in propellant and explosive compositions and having the formula:

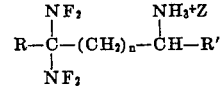

wherein R and R' are hydrogen or alkyl, Z is $Cl^-$, $ClO_4^-$ of $NO_3^-$ is disclosed.

7 Claims, No Drawings

DIFLUOROAMINO COMPOUNDS

BACKGROUND OF THE INVENTION

This invention relates to a high energy compound and more particularly to a gem-difluoroamino-ammonium perchlorate salt and to the method for its preparation.

It is well established that organic compounds containing one or more $-NF_2$ groupings are especially useful for their capability of releasing upon decomposition, large quantities of high energy, thereby rendering this class of materials particularly desirable as additives in high energy propellants and explosives. In particular, difluoroamino compounds decompose to produce gaseous hydrogen fluoride, releasing to the surroundings the high heat of formation of this by-product, notably 104 kilocalories per mole.

Both perchloric acid salts and nitric acid salts are well known for their generally high oxidizing potentials and have consequently been widely used as oxidants for high specific impulse propellant compositions. In contradistinction, the oxidizing potential of compounds containing only difluoroamino groupings is somewhat limited and hence are unsuitable for many oxidizing applications despite their high energy potentials. It would therefore be desirable to provide a composition which combines the high oxidizing potential of the perchloric acid salts or nitric acid salts with the high energy characteristics of the difluoroamino compositions.

SUMMARY OF THE INVENTION

Accordingly, it is an object of this invention to provide a novel composition of matter which combines the desirable properties of difluoroamino compounds with the desirable properties of perchloric acid salts or nitric acid salts.

It is also an object to provide a novel composition of matter containing both difluoroamino groupings and perchlorate or nitrate groupings which compound is especially useful as an oxidant for high energy propellants.

Further, it is an object to provide a method for preparing the foregoing compositions and to provide a reactive intermediate by which the aforesaid preparation may be facilitated.

These and other objects are achieved herein by providing an amino substituted gem-difluoroaminoalkane which may be further reacted with either perchloric acid or nitric acid to provide an ammonium salt of a gem-difluoroaminoalkane represented by the formula:

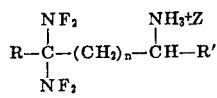

wherein R and R' may be the same or different and wherein each R and R' are alkyl or hydrogen, $n$ is an integer from 1-5 and Z is a radical selected from the group of $Cl^-$, $ClO_4^-$ and $NO_3^-$.

DETAILED DESCRIPTION OF PREFERRED EMBODIMENTS

The novel difluoroamino compound of this invention may be provided herein by the reaction of an amino gem-difluoroaminoalkane with perchloric acid or nitric acid at about room temperature or higher.

The amino gem-difluoroaminoalkane is prepared by the reaction of a halo substituted carbonyl compound with difluoroamine in the presence of concentrated sulfuric acid. The product of this reaction is then contacted with liquid ammonia at about room temperature and reacted until the halide is replaced with an $NH_2^-$ grouping.

The carbonyl containing compound may be either a halo substituted saturated aldehyde or a halo substituted saturated ketone. For example, carbonyl compounds operable herein include the ketones such as 5-bromo-2-pentanone, 4-chloro-2-pentanone, 5-bromo-3-pentanone, 1-methyl-5-chloro-2-pentanone, 4-bromo-2-hexanone, 5-bromo-5-methyl-3-butanone and the like; also aldehydes such as 4-bromobutanal, 4-chlorobutanal, 4-iodobutanal, 3-bromopentanal, 3-chlorohexanal and the like.

Preferably the reaction of difluoroamine with the halo-carbonyl compound is facilitated by the addition of the carbonyl to a refluxing solution of difluoramine in concentrated sulfuric acid. The reaction is normally complete after about 3 to 40 hours but minute quantities of halo substituted gem-difluoroaminoalkane can be detected within a much shorter period. The sulfuric acid used should have a concentration of at least 96 percent or more. Generally, the concentration may be between 96 percent and 130 percent with 100 percent being preferred. It is to be understood however that whenever a concentration of greater than 100 percent is indicated, the difference between the 100 percent and the figure given represents sulphur trioxide. The upper limit of sulfuric acid is not critical since it does not interfere with the reaction. However, generally at least one mole of sulfuric acid per mole of difluoroamine has been found to be adequate and at least three moles of sulfuric acid per mole of difluoroamine is preferred.

To facilitate the difluoroamine-carbonyl compound reaction, it is desirable to have a substantial excess of difluoroamine even though the reaction will occur with a mole ratio of only about 1:1 to 4:1 difluoroamine to carbonyl. Preferred is the molar ratio of 2:1.

By contacting liquid ammonia with the halo substituted gem-difluoroaminoalkane at about room temperature, a solvolytic reaction occurs in which the halide is replaced by an amino group.

In order to purify the resultant amino substituted gem-difluoroaminoalkane it is preferred to further react it with a strong acid such as hydrochloric acid, nitric acid or perchloric acid to form the corresponding salt which may be readily separated and purified. Obviously if it is intended to form the ammonium perchlorate or ammonium nitrate salt from the intermediate it is usually desirable to react their respective acids with the crude amino gem-difluoroamino compound at this point rather than first forming the hydrochloride salt. This reaction is facilitated merely by admixing the acid with the amine compound in an amount chemically equivalent to about 0.5 to 2 times the amine content of said amine compound at room temperature with stirring. Preferably the acid is admixed with said amine compound in equivalent molar amounts. By subsequently removing the water by evaporation, a crystalline phase of the desired product is formed which may be separated and purified.

Alternatively, the amino substituted difluoroaminoalkane can be reacted with hydrochloric acid and the crystals separated as above. In order to prepare the perchloric acid salt or nitric acid salt, from the hydrochloric acid salt, however, it is obviously necessary to regenerate a pure amine by neutralization with a suitable base prior to such reaction.

Having generally described the invention, further understanding can be obtained by reference to the following specific examples which are presented for purposes of illustration only and are not meant to be limiting in any manner,

EXAMPLE 1

About 15 ml of ammonia was condensed in a Fischer-Porter tube containing 1.50 g (0.0059 mole) of 1-bromo-4,4-bis(difluoroamino)pentane in 2 ml benzene. After stirring magnetically for 26 hours at room temperature, the ammonia was removed by distillation and 10 ml of aqueous sodium carbonate was added to the residue. The aqueous phase was extracted with methylene chloride. The extract was dried with sodium sulfate, and the methylene chloride removed by distillation under reduced pressure. The residue was dissolved in 5 ml of benzene, and the benzene evaporated under reduced pressure. This was repeated a second time to ensure the complete removal of ammonia.

The resultant product was a crude 1-amino-4,4-bis(difluoroamino)pentane.

EXAMPLE 2

A portion of the residual oil from Example 1 was then dissolved in 10 ml of 50 percent benzene/n-hexane (v/v), and hydrogen chloride passed into the solution. After standing overnight at −20°C, the red-colored salt was filtered and dried under reduced pressure to room temperature. The weight of crude 1-amino-4,4-bis(difluoroamino)pentane hydrochloride was 0.92 g (69 percent). After removing most of the color from the crystals by washing with methylene chloride, the weight was 0.68 g (51 percent). The crystalline product had no definite melting point, but decomposed over a wide temperature range.

Anal. Calc'd for $C_5H_{12}ClF_4N_3$: c, 26.21; H, 5.36; Cl, 15.75; F, 33.68; N, 18.62.

Found: C, 27.68, 26.64; H, 5.53, 5.21; Cl, 16–49, 16.15; N, 18.69, 18.41.

The infrared spectrum showed absorption bands at 3.1, 6.2, 6.4, 9.7, 9.9, 10.2, 10.9 and 11.2 microns.

EXAMPLE 3

A portion of the residual oil from Example 1 can be titrated at room temperature with dilute perchloric acid by admixing an equivalent amount of the acid with an equivalent amount of the 1-amino-4,4-bis-(difluoroamino)pentane. After removal of the water the crystals of 1-amino-4,4-bis(difluoroamino)pentane perchlorate can be recovered and color removed by washing with methylene chloride.

Substantially similar results are obtainable by substituting nitric acid for the acids in either examples 2 or 3, to provide 1-amino-4,4-bis(difluoroamino)pentane nitrate.

The perchloric acid salts of this invention are excellent oxidizers for most composite formulations. Moreover, because of their excellent oxygen to carbon balance they may be considered very high energy oxidants. One particularly good application for such materials is in the field of water soluble monopropellants in which water is used as a desensitizer. Such utility is particularly advantageous where ease of loading and low vapor pressure characteristics are required.

Although this invention has been described principally in terms of providing a novel perchlorate, hydrochloric or nitrate salt, it should also be understood that the amino substituted intermediates are themselves considered novel compositions of matter which also have specific utility as monopropellant compositions. In this context the amino groupings act as the fuel component while the difluoroamino groupings act as the oxidizant.

It is apparent that many widely different embodiments of the foregoing invention may be practiced without departing from the spirit and scope thereof and therefore the invention is not intended to be limited except as in the following claims.

What is claimed as new and desired to be covered by Letters Patent of the United States is:

1. A high energy composition having the structure

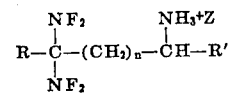

wherein Z is a radical selected from the group consisting of $Cl^-$, $ClO_4^-$ and $NO_3^-$, $n$ is an integer from 1–5 and wherein each R and R' may be the same or different, each being selected from the group consisting of alkyl and hydrogen.

2. A high energy composition having the structure;

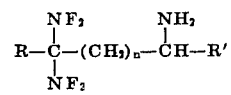

wherein each R and R' may be the same or different, each being selected from the group consisting of alkyl and hydrogen, and wherein $n$ is an integer from 1–5.

3. A method for preparing the high energy composition of claim 2 which comprises;

a. reacting difluoroamine, while in contact with a catalytic amount of sulfuric acid, with a carbonyl containing compound of the formula;

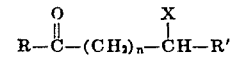

wherein X is a halogen selected from the group consisting of Cl, Br and I and wherein $n$ is an integer from 1–5, and wherein each R and R' may be the same or different radical each being selected from the group consisting of alkyl and hydrogen, b. replacing the halogen in the product formed in (a) with an amine grouping by reaction with ammonia, and c. separating said high energy composition.

4. The method of preparing the high energy composition of claim 1 which comprises reacting a strong acid selected from the group consisting of hydrochloric acid, perchloric acid and nitric acid with an amine containing difluoroaminoalkane having the structure:

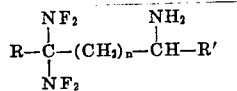

wherein each R and R' may be the same or different each being selected from the group consisting of alkyl and hydrogen and wherein $n$ is an integer from 1–5.

5. The method of claim 3 wherein said carbonyl compound is reacted with said difluoroamine in a mole ratio of from about 1/1 to about 1/4.

6. The method of claim 5 wherein said sulfuric acid is 100 percent concentrated sulfuric acid which is used in the ratio of about 3 moles of sulfuric acid per mole of difluoroamine.

7. The method of claim 4 wherein said acid is reacted with said amine containing difluoroaminoalkane in an amount chemically equivalent to about 0.5 to 2 times the amine content of said amine containing difluoroaminoalkane.

* * * * *